United States Patent [19]

Lee

[11] Patent Number: 5,894,203

[45] Date of Patent: Apr. 13, 1999

[54] HORIZONTAL RETRACE TIME ADJUSTMENT PULSE GENERATING CIRCUIT FOR A DISPLAY DEVICE

[75] Inventor: Joo-Hyoung Lee, Kyungki-do, Rep. of Korea

[73] Assignee: SamSung Electronics Co., Ltd., Kyungki-do, Rep. of Korea

[21] Appl. No.: 08/953,556

[22] Filed: Oct. 17, 1997

[30] Foreign Application Priority Data

Oct. 17, 1996 [KR] Rep. of Korea ............... 96-46551

[51] Int. Cl.⁶ ............... G09G 5/18; H04N 3/22; H01J 29/70
[52] U.S. Cl. ............... 315/387; 315/370; 315/384
[58] Field of Search ............... 315/367, 384, 315/387, 408, 370, 371, 389, 405; 348/637

[56] References Cited

U.S. PATENT DOCUMENTS

| | | |
|---|---|---|
| 4,223,251 | 9/1980 | Haferi ............... 315/370 |
| 4,547,710 | 10/1985 | Bond et al. ............... 315/403 |
| 4,705,993 | 11/1987 | Kashiwagi . | |
| 5,216,336 | 6/1993 | Rodriguez-Cavazos ............... 315/387 |
| 5,283,505 | 2/1994 | Bando ............... 315/411 |
| 5,289,052 | 2/1994 | Ryu ............... 307/273 |
| 5,656,894 | 8/1997 | Murakami et al. ............... 315/371 |
| 5,714,849 | 2/1998 | Lee ............... 315/408 |

*Primary Examiner*—Edward P. Westin
*Assistant Examiner*—Shane R. Gardner
*Attorney, Agent, or Firm*—Robert E. Bushnell, Esq.

[57] ABSTRACT

A horizontal retrace time adjustment pulse generating circuit includes a microcomputer for outputting a horizontal flyback signal and an analog voltage based on an input horizontal synchronizing frequency; oscillation duty adjusting circuit for outputting a duty-cycle adjusting signal based on the analog voltage of the microcomputer; a monostable multivibrator for outputting a rectangular wave based on the horizontal flyback signal of the microcomputer and the duty-cycle adjusting signal of the oscillation duty adjusting circuit; feedback signal detecting circuit for detecting a horizontal flyback pulse from a horizontal deflection circuit and outputting the detected signal; and signal coupling circuit for coupling the rectangular wave of the monostable multivibrator and the detected signal from the feedback signal detecting circuit and outputting a result of the coupling as a time control pulse for horizontal retrace.

15 Claims, 4 Drawing Sheets

HORIZONTAL RETRACE TIME ADJUSTMENT PULSE GENERATING CIRCUIT FOR A DISPLAY DEVICE

CLAIM OF PRIORITY

This application makes reference to, incorporates the same herein, and claims all benefits accruing under 35 U.S.C §119 from an application entitled *Horizontal Retrace Time Adjustment Pulse Generating Circuit For A Display Device* earlier filed in the Korean Industrial Property Office on Oct. 17, 1996, and there duly assigned Ser. No. 96-46551 by that Office.

BACKGROUND OF THE INVENTION

1. Field of the Invention

The present invention relates to a display device and, more particularly, to a horizontal retrace time adjustment pulse generating circuit for a display device, in which the retrace time of the horizontal deflection circuit is properly adjusted with respect to the flyback pulse.

2. Discussion of Related Art

An exemplary display device comprises a video preamplifier which amplifies a video input by means of a low-voltage amplifier and maintains the amplified signal at a predetermined level; a video main amplifier which amplifies the output from the video preamplifier and supplies the amplified signal energy for each pixel of a cathode-ray tube (CRT); a microcomputer which receives horizontal and vertical synchronizing signals to produce screen control signals; vertical and horizontal deflection circuits which receive the screen control signals and generate vertical and horizontal deflection signals for output to a deflection yoke mounted on the CRT; and a high voltage circuit which supplies the anode voltage for the CRT, using a flyback pulse generated by the horizontal deflection circuit.

The vertical and horizontal deflection signals control the deflection of an electron beam generated from an electron gun within the CRT, to thus form a displayed image on the screen or the display device. The horizontal scanning in which the electron beam is deflected horizontally and vertical scanning in which the electron beam is deflected vertically are performed concurrently.

In horizontal scanning, after completing the scanning of a horizontal line in the display area, the next line is scanned from a point just below that previously scanned. The time duration from the completion of the previous line to the beginning of the next is commonly called retrace time, or horizontal flyback time. To display a clear image void of retrace lines, the video signal is blanked during the retrace time. Thus, the display device is provided with a retrace time signal blanking circuit for generating a blanking signal to remove the retrace line caused by the horizontal flyback of the electron beam for scanning the next line. If the retrace line signal is not properly blanked, video noise appears on the display.

General design specifications set the retrace time to approximately 17–20% of one horizontal period and the blanking time to approximately 20–25% of one horizontal period. These percentages are not appropriate, however, for high-resolution monitors which use a high horizontal scanning frequency, due to a characteristic limitation of the output transistor of the horizontal deflection circuit.

It is therefore important to determine and maintain the proper blanking time with respect to retrace time, which is dependent on the horizontal frequency employed. For example, should the retrace time be reduced for a higher horizontal frequency or should the blanking time be increased for a lower horizontal frequency, the horizontal deflecting current increases which increases power consumption and tends to overheat the output transistor. Also, shorter retrace times result in high voltage peaks in the output of the horizontal deflection circuit, which also is harmful to the output transistor. Meanwhile, the retrace time should be set with regard to the highest horizontal frequency used in a given display device, such that the deflection current, which is increased in a relatively low frequency mode to achieve full video deflection, may be too high for the output transistor.

One prior horizontal deflection circuit for providing a horizontal retrace time adjustment is contemplated by U.S. Pat. No. 4,705,993 to Shigeru Kashiwagi and entitled Horizontal Deflection Circuit Having A Variable Retrace Period utilizes a switching device which has a drawback of requiring user intervention by necessarily requiring the user to manipulate a switch for intermittently coupling a second capacitor to a first capacitor in a resonant circuit to vary the retrace period.

SUMMARY OF THE INVENTION

Accordingly, the present invention is directed to a circuit that generates a retrace time adjustment pulse which is temporally positioned in the center of the flyback pulse, so that a proper blanking signal may be realized.

It is an object of the present invention to provide a horizontal retrace time adjustment pulse generating circuit that substantially obviates one or more of the problems due to limitations and disadvantages of the related art.

Another object of the invention is to provide a horizontal retrace time adjustment pulse generating circuitry which eliminates undue stress on the output transistor of a horizontal deflection circuit.

Yet another object of the invention is to provide a horizontal retrace time adjustment pulse generating circuit which reduces video noise resulting from retrace lines.

To accomplish these and other objects of the present invention, there is provided a horizontal retrace time adjustment pulse generating circuit, comprising; a microcomputer for outputting a horizontal flyback signal and an analog voltage based on an input horizontal synchronizing frequency; oscillation duty adjusting means for outputting a duty-cycle adjusting signal based on the analog voltage of the microcomputer; a monostable multivibrator for outputting a rectangular wave based on the horizontal flyback signal of the microcomputer and the duty-cycle adjusting signal of the oscillation duty adjusting means; feedback signal detecting means for detecting a horizontal flyback pulse from a horizontal deflection circuit and outputting the detected signal; and signal coupling means for coupling the rectangular wave of the monostable multivibrator and the detected signal from the feedback signal detecting means and outputting a result of the coupling as a time control pulse for horizontal retrace.

It is to be understood that both the foregoing general description and the following detailed description are merely exemplary and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
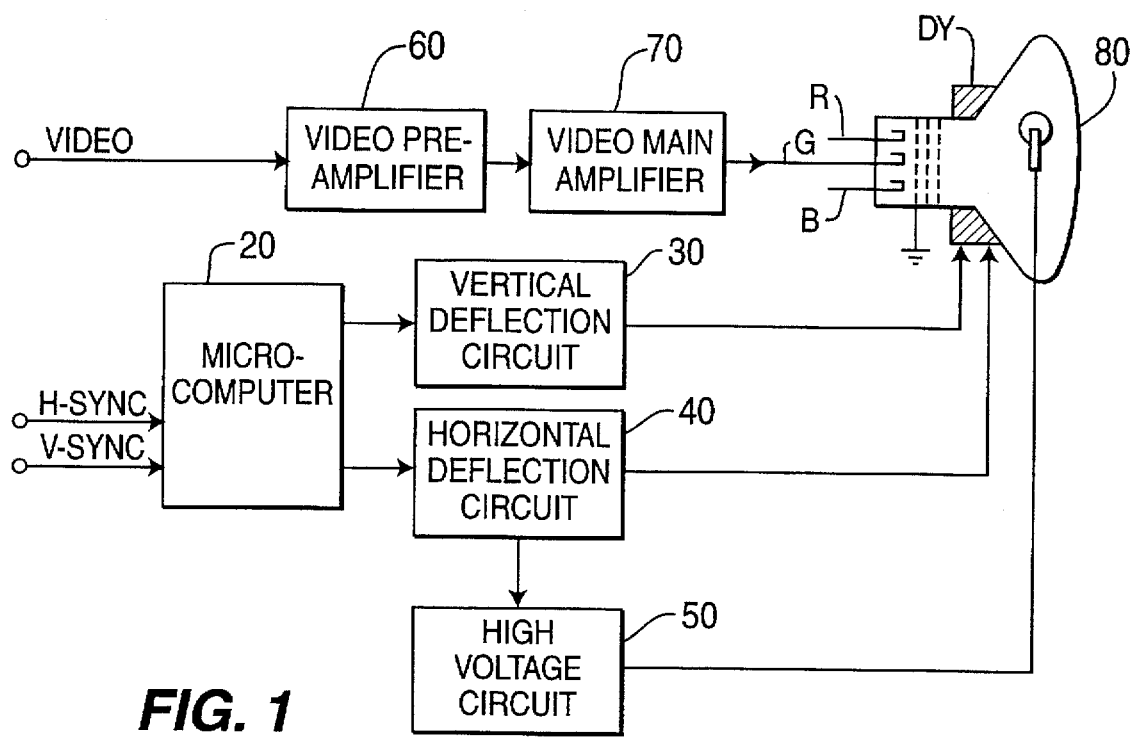
FIG. 1 is a generalized block diagram of an exemplary display device.

An exemplary display device, as shown in FIG. 1, comprises a video preamplifier 60 which amplifies a video input by means of a low-voltage amplifier and maintains the amplified signal at a predetermined level; a video main amplifier 70 which amplifies the output from the video preamplifier to 40–60 Vpp and supplies the amplified signal energy for each pixel of a cathode-ray tube (CRT) 80; a microcomputer 20 which receives horizontal and vertical synchronizing signals to produce screen control signals; vertical and horizontal deflection circuits 30 and 40 which receive the screen control signals and generate vertical and horizontal deflection signals for output to a deflection yoke (DY) mounted on the CRT; and a high voltage circuit 50 which supplies the anode voltage for the CRT, using a flyback pulse generated by the horizontal deflection circuit.

Figure 2:
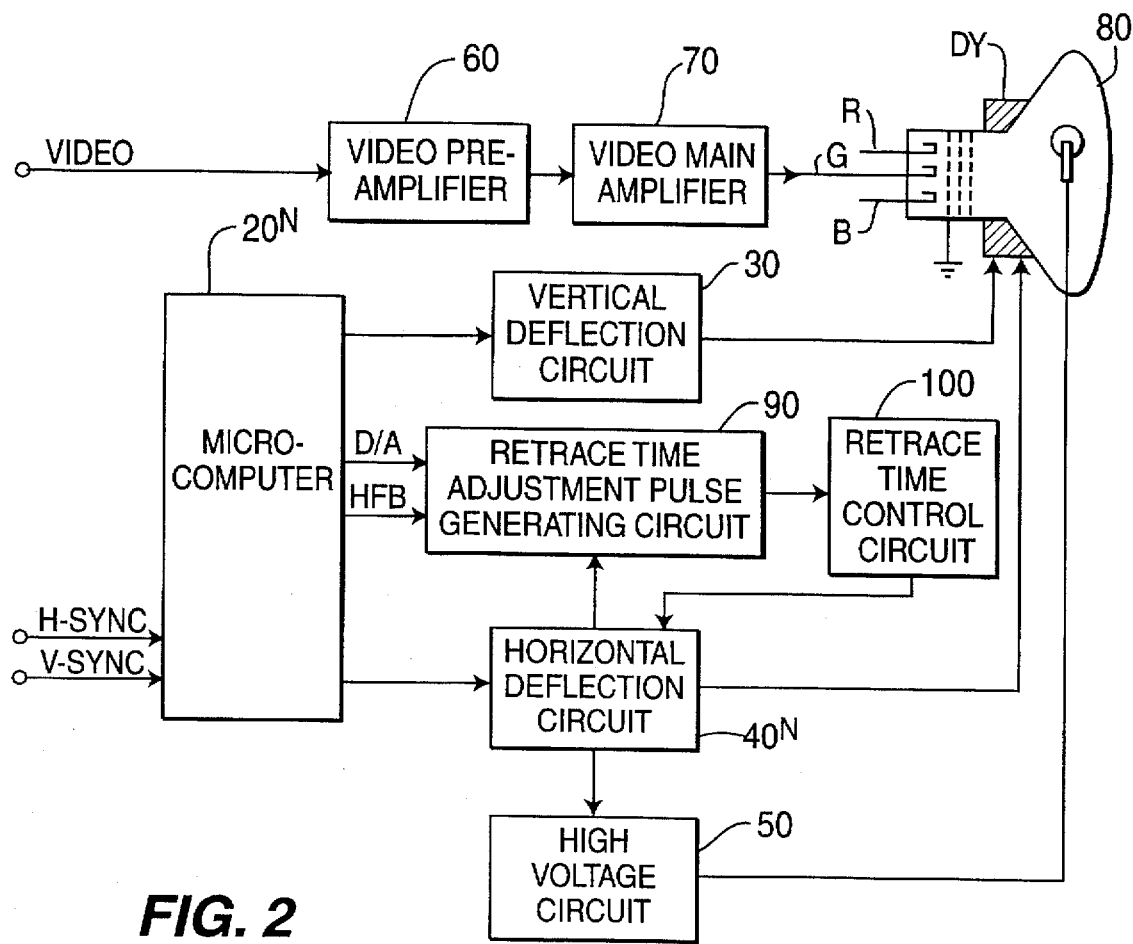
FIG. 2 is a block diagram of the display device including a retrace time adjustment pulse generating circuit according to the present invention.

The display device of FIG. 2 similar to the device of FIG. 1 and is further provided with a horizontal retrace time adjustment pulse generating circuit 90, according to the present invention, for controlling a retrace time control circuit 100 by using microcomputer output signals derived from the horizontal synchronizing signal. A complete description of the operation and construction of the retrace time control circuit can be found in allowed U.S. patent application Ser. No. 08/785,972, incorporated by reference herein.

Figure 3:
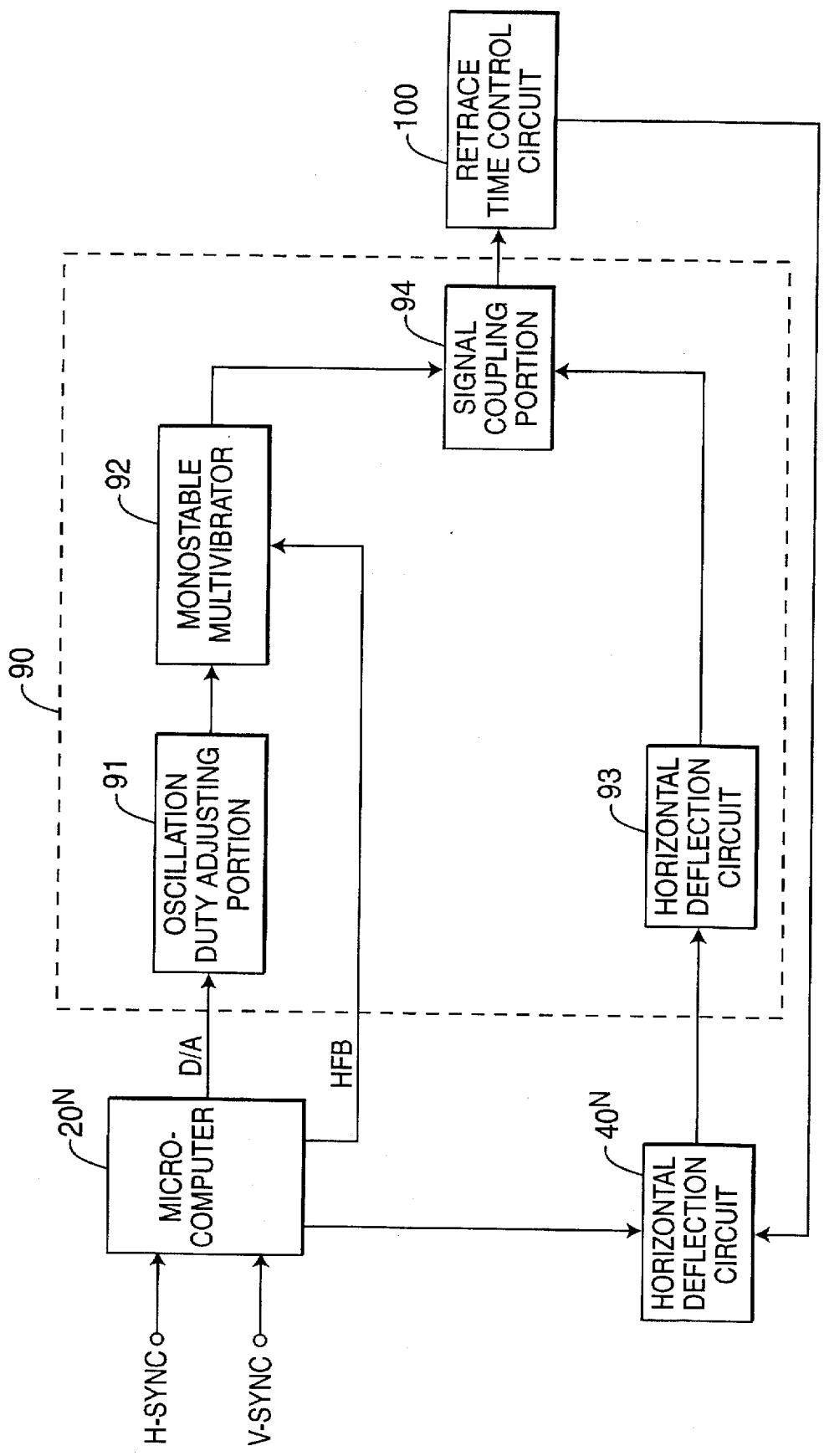
FIG. 3 is a more-detailed block diagram of the relevant elements of FIG. 2.

Referring to FIG. 3, microcomputer $20^N$ converts a received horizontal synchronizing signal (H-SYNC) into an analog output using an internal digital-to-analog converter (not shown) and outputs the D/A result. An oscillation duty adjusting portion 91 uses the received output voltage (D/A) to adjust the oscillation duty of a monostable multivibrator 92 which generates a square wave signal based on a horizontal flyback signal (HBF) output by microcomputer $20^N$. Horizontal deflection circuit $40^N$ outputs an amplified horizontal drive signal and a feedback signal detecting portion 93 detects a flyback pulse from horizontal deflection circuit $40^N$. A signal coupling portion 94 couples the rectangular wave output signal from monostable multivibrator 92 and the output signal of feedback signal detecting portion 93.

Figure 4:
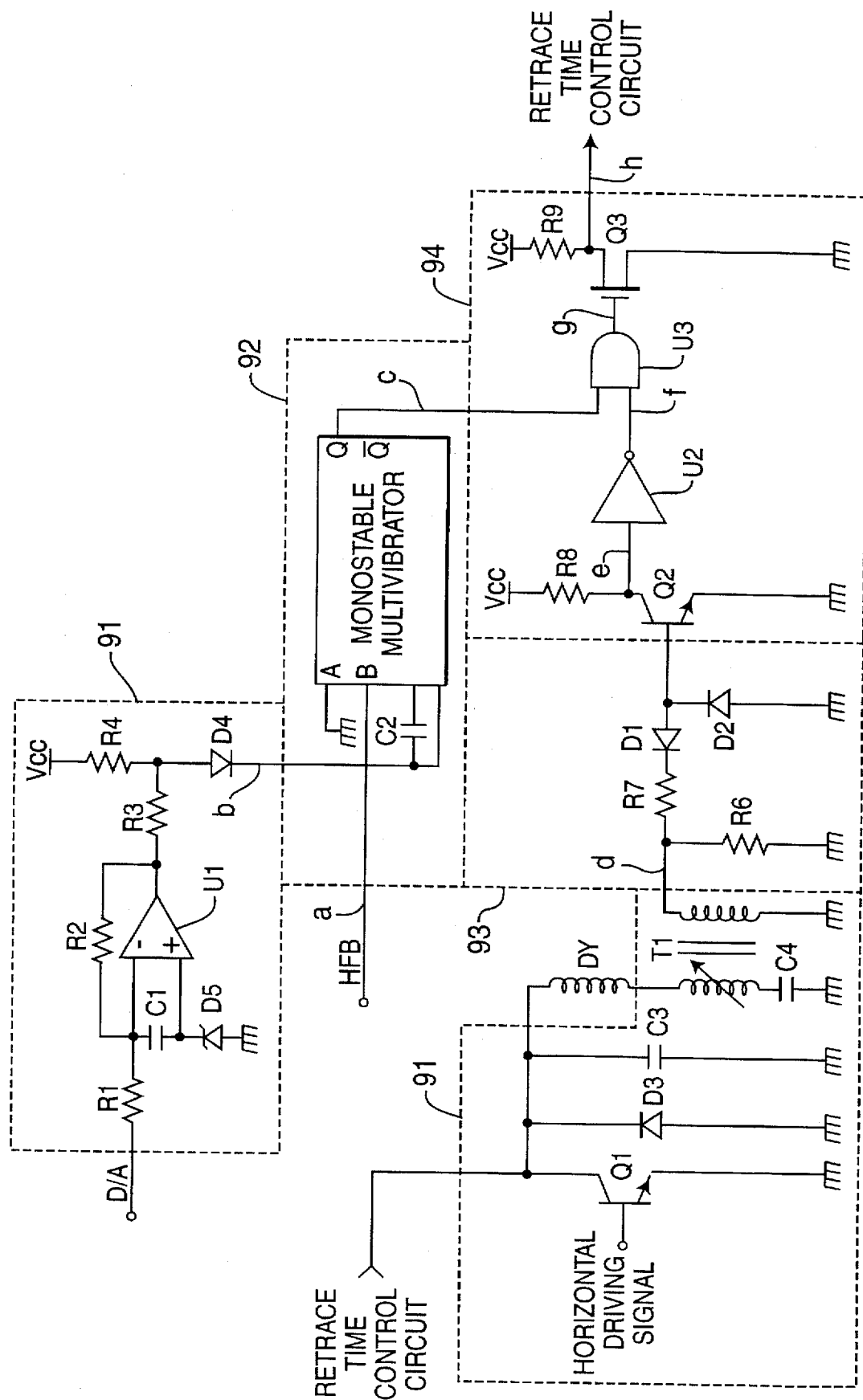
FIG. 4 is a circuit diagram of the retrace time adjustment pulse generating circuit according to the present invention.

In the detailed construction of the above circuit, as shown in FIG. 4, the oscillation duty adjusting portion 91 is comprised of an operational amplifier U1 which receives, via an input resistor R1, the analog output voltage (D/A) from microcomputer $20^N$ at its inverting input terminal and compares it with a reference voltage, from a zener diode D5, applied at its non-inverting input terminal. A capacitor C1 is connected between the inverting and non-inverting input terminals of operational amplifier U1. A feedback resistor R2 is connected between an output terminal and the inverting input terminal of operational amplifier U1. An output resistor R3, which limits the output voltage of operational amplifier U1, is connected between the output terminal of operational amplifier U1 and to a node connecting a resistor R4 to an anode of a circuit protection diode D4 which prevents reverse current flow. Resistor R4 is further connected to a supply voltage Vcc. A cathode of diode D4 is connected to monostable multivibrator 92 directly and via a capacitor C2. Capacitor C2 is an external oscillation capacitor, and together with the direct input from diode D4, determines the duty cycle of the rectangular wave output of monostable multivibrator 92.

Horizontal output circuit $40^N$ is comprised of a horizontal driving transistor Q1 having a base for receiving a horizontal drive signal an emitter connected to a ground terminal and a collector connected to an output of retrace time control circuit 100. The collector provides a horizontal deflection signal to a deflection yoke DY. A damping diode D3 and a capacitor C3 are connected in parallel between the collector and the ground terminal. A deflection transformer T1 and a S-correction capacitor C4 are connected in series between deflection yoke DY and the ground terminal.

Feedback signal detecting portion 93 is comprised of voltage-dividing resistors R6 and R7 which divide an induction voltage from the secondary coil of deflection transformer T1, a rectifying diode D1, and a reference point diode D2.

Signal coupling portion 94 is comprised of an input transistor Q2 having a first load resistor R8 connected between its collector and supply voltage Vcc. The base of transistor Q2 receives the detected feedback signal from feedback signal detecting portion 93. An inverter U2 is connected to the collector of transistor Q2 for inverting the signal input therefrom. An AND gate U3 receives the inverted output of inverter U2 at one input terminal and another input terminal of AND gate U3 is connected to the Q output terminal of monostable multivibrator 92 and performs an AND operation on the received inputs. An output of AND gate U3 is provided to the gate of an output transistor Q3 having a second load resistor R9 connected between its drain and supply voltage Vcc and the source of transistor Q3 is connected to a the ground terminal. The drain of transistor Q3 supplies a retrace time adjustment pulse to retrace time adjustment circuit 100.

The operation of the circuit shown in FIG. 4 will now be explained in conjunction with the waveforms of FIGS. 5A–5I. At point a, the HFB signal, FIG. 5A, output from microcomputer $20^N$ is applied to monostable multivibrator 92 at input terminal B. Meanwhile, the D/A output signal of microcomputer $20^N$ is applied to the inverting input of the operational amplifier U1 of oscillation duty adjusting portion 91 via resistor R1. Thus, for example, if the input voltage to operational amplifier U1 is high the output voltage thereof is low, and the low output at point b, FIG. 5B, increases the duty cycle of the output of monostable multivibrator 92 at point c, FIG. 5C. Likewise, the converse is true for a low input voltage to the operational amplifier U1.

Figure 5A:
FIGS. 5A–5I shows the waveforms of various signals present at respective points of the circuit of FIG. 4.
Figure 5B:
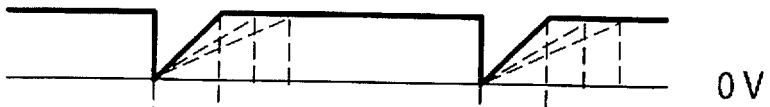
Figure 5C:
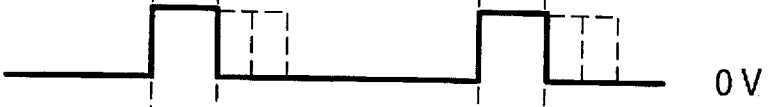
Figure 5D:
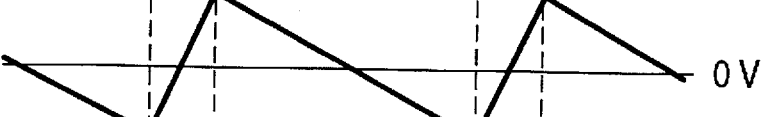
Figure 5E:
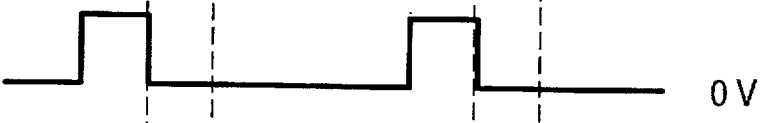

In horizontal deflection circuit $40^N$, a horizontal driving signal is amplified and induced at point d at the output of the deflection transformer T1 as a horizontal flyback pulse, FIG. 5D, which is applied to rectifying diode D1 of feedback detecting portion 93 through voltage dividing resistors R6 and R7. Here, negative components are removed and the rectified signal is applied to the base of transistor Q2 of signal coupling portion 94 with respect to reference diode D2. The applied signal is amplified and appears at point e, FIG. 5E, and is input to inverter U2 where it is inverted to get the waveform of FIG. 5F at point f.

Figure 5F:
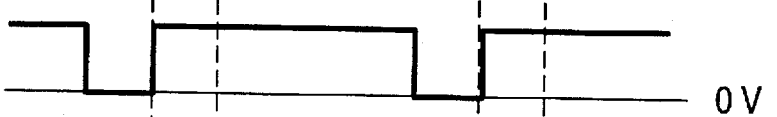
Figure 5G:
Figure 5H:
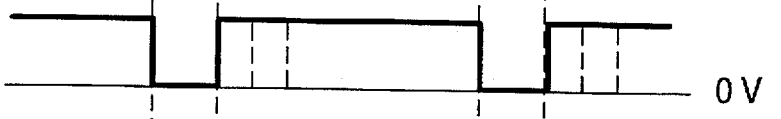
Figure 5I:

The two waveforms applied to the AND gate U3, that is, the rectangular waveform of FIG. 5C at point c output from the Q output terminal of monostable multivibrator 92 and the inverted output waveform FIG. 5F at point f from inverter U2, are AND-operated, resulting in the synthesized waveform of FIG. 5G at point g, which is then amplified and inverted by output transistor Q3 as shown in FIG. 5H at point h. The final output waveform is accurately centered in the flyback pulse shown in FIG. 5I and can be employed as a retrace time adjustment pulse.

The illustrated dotted lines indicate how a change in the output, FIG. 5B, of oscillation duty adjusting portion 91 influence the output, FIG. 5C, of monostable multivibrator 92 and consequently, the respective outputs, FIGS. 5G and 5H, of AND gate U3 and output transistor Q3.

As above, there is provided a horizontal retrace time adjustment pulse generating circuit in which an operational amplifier uses a microcomputer output voltage to adjust the duty cycle of a monostable multivibrator, and a pulse-detected deflection signal is compared with the adjusted rectangular wave output, to thereby generate a retrace time adjustment pulse which is temporally centered in the flyback pulse.

It will be apparent to those skilled in the art that various modifications can be made in the horizontal retrace time adjustment pulse generating circuit of the present invention without departing from the spirit of the invention. Thus, it is intended that the present invention cover such modifications as well as variations thereof within the scope of the appended claims and their equivalents.

What is claimed is:

1. A horizontal retrace time adjustment pulse generating circuit, for controlling a retrace time control circuit, comprising:
    a microcomputer responsive to received horizontal synchronizing signals for outputting a horizontal flyback signal and an analog voltage;
    oscillation duty adjusting means for outputting a duty cycle adjusting signal in response to said analog voltage output from said microcomputer;
    a monostable multivibrator for outputting a rectangular wave in response to said horizontal flyback signal output by said microcomputer and said duty cycle adjusting signal output by said oscillation duty adjusting means;
    feedback signal detecting means for detecting a horizontal flyback pulse from a horizontal deflection circuit and outputting the detected flyback pulse; and
    signal coupling means for coupling said rectangular wave and said detected flyback pulse and outputting a result of the coupling as a horizontal retrace time adjustment pulse.

2. The horizontal retrace time adjustment pulse generating circuit as set forth in claim 1, wherein said oscillation duty adjusting means comprises an operational amplifier for comparing said analog voltage of said microcomputer with a reference voltage and outputting said duty cycle adjusting signal as a comparison result.

3. The horizontal retrace time adjustment pulse generating circuit as set forth in claim 1, wherein said signal coupling means comprises an AND gate for producing a composite signal based on the outputs of said monostable multivibrator and said feedback signal detecting means.

4. A horizontal retrace time adjustment pulse generating circuit, for controlling a retrace time control circuit, comprising:
    a microcomputer for digital-to-analog converting a received horizontal synchronizing signal into an analog voltage and for outputting a horizontal flyback signal in response to said received horizontal synchronizing signals;
    a monostable multivibrator for outputting a rectangular wave in response to said horizontal flyback signal output by said microcomputer;
    oscillation duty adjusting means for outputting a duty cycle adjusting signal in response to said analog voltage output from said microcomputer for controlling a duty cycle of said rectangular wave;
    feedback signal detecting means for detecting a horizontal flyback pulse from a horizontal deflection circuit and outputting the detected flyback pulse; and
    signal coupling means for generating a horizontal retrace time adjustment pulse by combining said rectangular wave and said detected flyback pulse.

5. The horizontal retrace time adjustment pulse generating circuit as set forth in claim 4, wherein said duty cycle adjusting signal is directly applied to one input of said monostable multivibrator and is applied to a second input thereof via an external oscillation capacitor.

6. The horizontal retrace time adjustment pulse generating circuit as set forth in claim 4, said oscillation duty adjusting means comprising:
    a first resistor connected to receive said analog voltage output from said microcomputer;
    an operational amplifier having an inverting input terminal connected to receive said analog voltage output from said microcomputer through said first resistor;
    a capacitor connected between said inverting input terminal and a non-inverting input terminal of said operational amplifier;
    a zener diode connected between a ground terminal and said non-inverting input terminal for providing a reference voltage to said non-inverting input terminal for comparison to said analog voltage;
    a second resistor connected between an output terminal of said operational amplifier and said inverting input terminal;
    a third resistor connected between said output terminal of said operational amplifier and a node;
    a fourth resistor connected between a voltage source and said node; and
    a protection diode connected between said node and said monostable multivibrator for protecting said oscillation duty adjusting circuit from reverse current flow, said protection diode outputting said duty cycle adjusting signal.

7. The horizontal retrace time adjustment pulse generating circuit as set forth in claim 4, said horizontal deflection circuit comprising a horizontal driving transistor having a base for receiving a horizontal drive signal and a collector connected to an output of said retrace time control circuit for providing a horizontal deflection signal to a horizontal deflection coil.

8. The horizontal retrace time adjustment pulse generating circuit as set forth in claim 4, said feedback signal detecting means comprising:

a first resistor connected in parallel with a secondary coil of a deflection transformer of said horizontal deflection circuit;

a second resistor having one end commonly connected to said first resistor and said secondary coil, said first and second resistors dividing an induced voltage formed by said secondary coil; and first and second diodes connected in series between a second end of said second resistor and said ground terminal, wherein a first diode rectifies said detected flyback pulse.

9. The horizontal retrace time adjustment pulse generating circuit as set forth in claim 4, said signal coupling means comprising:

an input transistor having a base connected to receive said detected flyback pulse, a collector for outputting an amplified signal, said collector being connected to a voltage source via a load resistor, and an emitter connected to a ground terminal;

an inverter connected to receive said amplified signal for outputting an inverted amplified signal;

an AND gate having a first input terminal connected to receive said inverted amplified signal, a second input terminal connected to receive said rectangular wave, and an output terminal; and an output transistor having a gate connected to said output terminal of said AND gate, a source connected to said ground terminal and a drain for outputting said horizontal retrace time adjustment pulse, said drain being connected to said voltage source via a second load resistor.

10. The horizontal retrace time adjustment pulse generating circuit as set forth in claim 6, wherein said duty cycle adjusting signal is directly applied to one input of said monostable multivibrator and is applied to a second input thereof via an external oscillation capacitor.

11. The horizontal retrace time adjustment pulse generating circuit as set forth in claim 4, said horizontal deflection circuit comprising:

a horizontal driving transistor having a base for receiving a horizontal drive signal, an emitter connected to a ground terminal, and a collector connected to an output of said retrace time control circuit for providing a horizontal deflection signal to a horizontal deflection coil;

a first diode connected between said collector and said ground terminal;

a first capacitor connected between said collector and said ground terminal;

a deflection transformer having a primary coil connected to said horizontal deflection coil for receiving a horizontal flyback voltage and a secondary coil for forming an induced voltage in response to said horizontal flyback voltage; and a S-correction capacitor connected between said primary coil and said ground terminal.

12. The horizontal retrace time adjustment pulse generating circuit as set forth in claim 11, said feedback signal detecting means comprising:

a first resistor connected in parallel with said secondary coil of said deflection transformer of said horizontal deflection circuit;

a second resistor having a first end commonly connected to said first resistor and said secondary coil, said first and second resistors dividing said induced voltage formed by said secondary coil to form said detected flyback pulse; and second and third diodes connected in series between a second end of said second resistor and said ground terminal, wherein said second diode outputs a rectified flyback pulse by rectifying said detected flyback pulse.

13. The horizontal retrace time adjustment pulse generating circuit as set forth in claim 12, said signal coupling means comprising:

an input transistor having a base connected to receive said rectified flyback pulse, a collector for outputting an amplified signal, said collector being connected to a voltage source via a load resistor, and an emitter connected to said ground terminal;

an inverter connected to receive said amplified signal for outputting an inverted amplified signal;

an AND gate having a first input terminal connected to receive said inverted amplified signal, a second input terminal connected to receive said rectangular wave, and an output terminal; and an output transistor having a gate connected to said output terminal of said AND gate, a source connected to said ground terminal and a drain for outputting said horizontal retrace time adjustment pulse, said drain being connected to said voltage source via a second load resistor.

14. A method for generating a horizontal retrace time adjustment pulse for controlling a retrace time control circuit, said method comprising:

outputting an analog voltage from a microcomputer by digital-to-analog converting a received horizontal synchronizing signal;

outputting a horizontal flyback signal from said microcomputer in response to said horizontal synchronizing signal;

generating a duty cycle adjusting signal by comparing said analog voltage to a reference voltage provided by a zener diode;

generating a rectangular wave in response to said horizontal flyback signal and said duty cycle adjusting signal;

detecting a flyback pulse fed back from a deflection coil;

rectifying said detected flyback pulse; and combining said rectified flyback pulse with said rectangular wave to generate said horizontal retrace time adjustment pulse.

15. The method as set forth in claim 14, wherein said combining step comprises the steps of:

generating an amplified flyback pulse by amplifying said rectified flyback pulse;

providing said amplified flyback pulse and said rectangular wave to respective input terminals of an AND gate;

providing an output of said AND gate to an output transistor, said output transistor generating said horizontal retrace time adjustment pulse.

* * * * *